Nov. 15, 1955         A. T. CANDY         2,723,480
KNOCK-DOWN DUCK DECOY OF A SILHOUETTE TYPE
Filed July 2, 1953
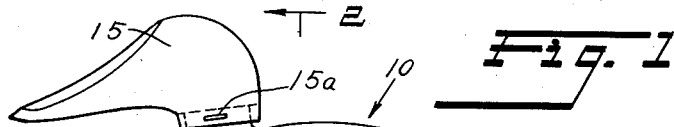
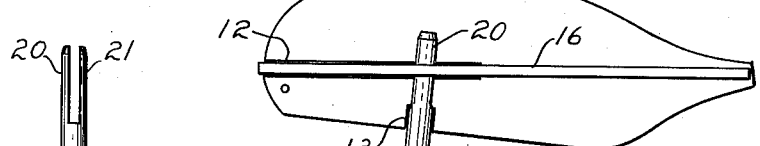
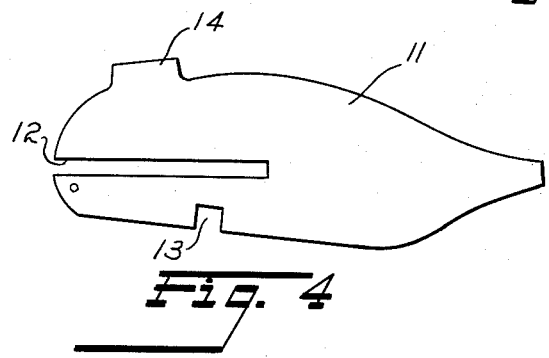
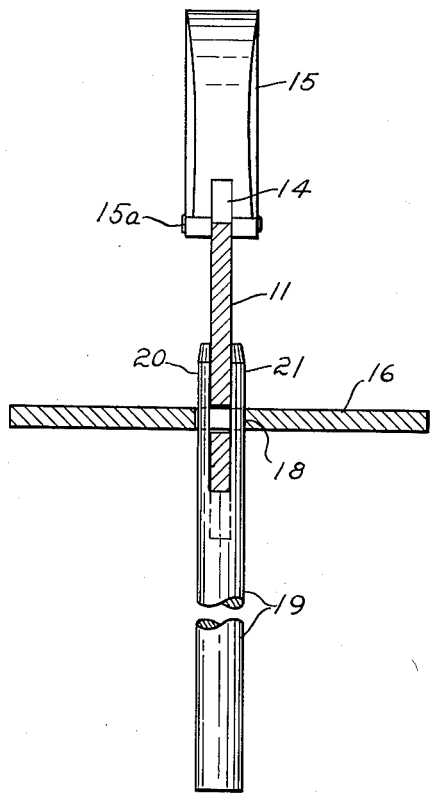
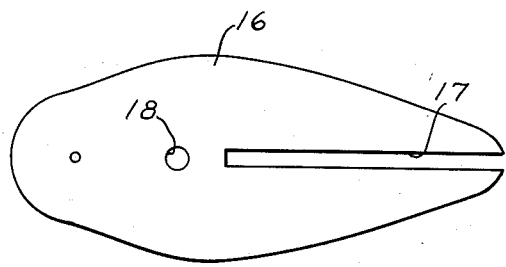
INVENTOR
ALBERT T. CANDY
BY *Jones & Young*
ATTORNEY

United States Patent Office 2,723,480
Patented Nov. 15, 1955

2,723,480

KNOCK-DOWN DUCK DECOY OF A SILHOUETTE TYPE

Albert T. Candy, Kearney, Nebr.

Application July 2, 1953, Serial No. 365,681

3 Claims. (Cl. 43—3)

The present invention relates to an improved duck decoy and more particularly to an improved knock-down duck decoy of the silhouette type and having a novel locking arrangement thus eliminating any need for outside locking means when the decoy is assembled.

Duck decoys have been made in various types and forms ranging from very simple silhouette types to molded and carved decoys and the like in the initiation of a true bird. None of these prior devices have been of such construction that they can be readily knocked down for carrying and storage when not in use and yet assembled quite easily for use with the component parts being held in interlocked relationship without the need of any additional securing means.

It is therefore a principal object of the present invention to provide a silhouette-type duck decoy that can be readily knocked down and assembled instantly.

Another object of the present invention is to provide a silhouette-type duck decoy in which the component parts are interlocked in a new and novel manner and required no extraneous locking means.

An additional object of the present invention is to provide a knock-down duck decoy which has relatively few parts and when knocked down makes a small compact package.

A still further object of the present invention is to provide a knock-down duck decoy in which the component parts are interlocked with one another in tight engagement to provide a decoy in which the parts are virtually immovable.

Still another object of the present invention is to provide a duck decoy of the character described that is of extremely simple construction and is economically feasible to manufacture.

Other and additional objects will become apparent from the ensuing description taken in conjunction with the accompanying drawing.

Broadly stated, in the attainment of the foregoing and related objects, the duck decoy made in accordance with the present invention comprises a body member having a head member secured at one end thereof, a wing member detachably secured to said body member in transverse relationship, said body member and said wing member being provided with a slot at its bottom edge and a hole respectively, said slot and said hole being in vertical alignment with one another, and a ballast member detachably secured in said slot and said hole for locking the body member and wing member together.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawing in which:

Fig. 1 is a side elevation of a duck decoy made in accordance with the present invention illustrating the decoy in assembled form;

Fig. 2 is a section taken on lines 2—2 of Fig. 1;

Fig. 3 is a front elevation of the ballast illustrating the finger arrangement;

Fig. 4 is a side elevation of the body member of the decoy made in accordance with the present invention; and Fig. 5 is a top plan view of the wing portion of the duck decoy made in accordance with the present invention.

Referring now to the drawing, the illustrative embodiment of the duck decoy 10 made in accordance with the present invention comprises a body member 11 made from a single flat piece of material in the configuration or silhouette of a duck body. The body member 11 is provided with an elongated longitudinal slot 12 extending from the forward end of the body 11 rearwardly and in transverse relationship to the vertical or short axis of the body member 11. The bottom edge of the body member 11 is provided with a small cut-out area or vertical slot 13 extending upwardly to a point beneath and forwardly from the rear point of the longitudinal slot 12. The body member 11 may be provided with a small neck piece 14 for receiving the simulated duck head 15. The duck head 15 is of the general outline of a conventional duck head and has its bottom edge slotted lengthwise for receiving the neck member 14 in tight engagement within the slot. The duck head 15 is preferably permanently secured to the neck piece by staple 15a as shown or by any suitable means such as, for example, nailing, gluing, etc. Alternatively, the duck head may be, if desired, integrally formed with the body.

The wing member 16 is a flat one-piece body having the general configuration and silhouette of a pair of wings and is preferably made from material similar to that employed in body member 11. The wing member 16 is provided with an elongated centrally-extending longitudinal slot 17 extending forwardly from the rearmost point of the body member 16 and in transverse relationship to its short axis. A round opening 18 is centrally positioned at a point forwardly from the forward end of said longitudinal slot 17 and in alignment therewith. The association of the slot 13 of the body member 11 and the hole 18 is extremely important in producing the duck decoy 10 having the attendant advantages of this invention. The association of these two elements will be discussed in greater detail with respect to the assembled duck decoy.

A ballast member 19 is to be employed in the assembling of the decoy 10 and the locking of the body member 11 and wing member 16 together in very tight engagement. The ballast member 19 is preferably an elongated cylindrical body and is provided at one end with a pair of spaced fingers 20 and 21 which may be formed by cutting out a central piece from one end of the ballast 19. The length of the fingers 20 and 21 are quite important since they will function as the final locking means for the decoy 10. In assembled relationship, the fingers 20 and 21 must be of a length sufficient to extend upwardly from the bottom of the body member 11 to a point above the point at which the wing member 16 is joined to the body member 11. By the term "ballast member" as employed herein and in the appended claims, it is intended to include not only a ballast member but also a handle for inserting the duck decoy in marshy land where the decoy will be in fixed position. Moreover, the ballast member may further include anchoring means when the decoy is to be used in deep water.

In assembling the various parts hereinbefore described to form the complete duck decoy 10, this operation is accomplished quite easily and in a matter of seconds.

To form the duck decoy 10, the wing member 16 is placed in transverse relationship to the body member 11 with the slot 17 of the wing member 16 in alignment with the slot 12 of the body member 11. The wing member 16 is then pushed rearwardly to interfit the wing member 16 to the body member 11 in transverse relationship. The rear portions of the wing member 16 on either side of the slot 17 will be in close engagement with each side of the rear portion of the body member 11 in transverse relationship thereto. Similarly, the top and bottom forward ends of the body member 11 on either side of the slot 12 will be in close engagement with the forward end of each side of the wing member 16 and in transverse relationship thereto. The longitudinal length of the body member 11 and the wing member 16 and the longitudinal length of slots 12 and 17 must be of a length correlated to one another such that when the body member 11 and wing member 16 are interfitted in tranverse relationship as hereinbefore described, a complete silhouette type duck decoy will be formed with no elements free. It should be further noted that the interfitting relationship just described will result in the duck decoy having some play between the parts with respect to up and down movement and freely movable back and forth.

To lock the duck decoy in a position where the elements will have virtually no movement in any direction, the alignment of slot 13 in body member 11 and the circular opening 18 of the wing member 16 are of paramount importance. The interfitting of the wing member 16 with the body member 11 in the manner previously described must place the opening 18 above and in substantially vertical alignment with the slot 13. The ballast member 19 is then placed in vertical alignment with slot 13 with the spaced fingers 20 and 21 in alignment with each side of the body member 11. The ballast member 19 is then thrust upwardly with the fingers 20 and 21 passing on either side of the body member 11 and up through the hole 18 of the wing member 16, still with the fingers on either side of the body member 11. The ballast member 19 is continued upwardly until the bottom of the slot resulting from the fingers 20 and 21 is in tight engagement with the top surface of the slot 13 of the body member 11. This will result in the fingers 20 and 21 of the ballast member 19 being pushed well above the wing member 16 with the finger members 20 and 21 in close engagement with each side of the body member 11. The duck decoy 10 formed in this manner will have virtually no movement between the associated parts in any direction and will be in a completely fixed and locked position in the manner of a decoy formed from a single piece of material.

To knock down the decoy after being used, the ballast member 19 is pulled downwardly to free the same from the opening 18 and the slot 13. The wing member 16 is then pulled forwardly away from the body member 11 to free these two component parts. Thus it is seen that the decoy 10 of the present invention can be either assembled or disassembled by using only two movements and in a matter of seconds, with the duck decoy 10, when assembled, being in a rigidly fixed condition and when disassembled having only three separate parts.

In the description hereinbefore given with respect to interlocking the body member 11 and the wing member 16 by means of the ballast member 19, it is to be understood that this embodiment is illustrative only with respect to the configuration of the opening 18 and the interfitting of the fingers 20 and 21 of the ballast member 19 therein. For example, in this illustrative embodiment, the opening 18 is shown as being circular. With a circular opening in the wing member 16, the fingers 20 and 21 should have their outer free surface arcuate in order for the fingers 20 and 21 to conform with the configuration of the opening 18 in the wing member 16 and to properly engage the opening. However, the opening 18 does not necessarily have to be circular but could be a square opening equally as well. With the use of a square opening obviously the fingers 20 and 21 of the ballast member 19 would likewise have to be square. It is to be understood therefore that the opening 18 of the wing member 16 may be of any desired configuration with the fingers 20 and 21 of the ballast member 19 being of a corresponding configuration with respect to their outer surface.

In the description hereinbefore given with respect to the component parts of the duck decoy 10, no description has been given with respect to the materials to be employed in the manufacture of such component parts. Any suitable material such as, for example, wood, plastic, plywood, waterproof fibreboard, light metal, and the like, may be employed but the preferred material is wood from a standpoint of cost, ease of manufacture and durability.

In the description given hereinbefore of an illustrative embodiment of the present invention, such description has been confined to a silhouette-type duck decoy. While the present invention is primarily directed to a decoy of this type, the invention is not necessarily limited thereto since the novel feature with respect to interlocking of the component parts to form the completed duck decoy could be easily employed with duck decoys of a non-silhouette-type.

The present invention is not to be limited to the illustrative embodiment described herein and shown in the annexed drawing since there are other and additional modifications that are fully apparent and obvious within the spirit and scope of the invention.

Having described my invention I claim:

1. A duck decoy comprising a body member having a head member secured at one end thereof, a one-piece wing member detachably secured to said body member in transverse relationship thereto, said body member and said wing member being respectively provided with a vertical slot at the bottom edge of said body member and an opening in alignment with the longitudinal axis of said wing member, said vertical slot and said opening being in vertical alignment with one another, and a ballast member having a central slot extending downwardly from its upper free end forming spaced finger portions at either side thereof detachably positioned at opposite sides of and above said vertical slot with said finger portions extending upwardly therefrom through said aligned opening to tightly engage each side of said body member both below and above said wing member.

2. A duck decoy comprising a body member having a head member secured at one end thereof, a one-piece wing member detachably secured to said body member by means of an interfitting joint in transverse relationship thereto, said body member and said wing member being provided respectively with a vertical slot at the bottom edge of said body member, and an opening positioned in alignment with the longitudinal axis of said wing member, said vertical slot and said opening being spaced in vertical alignment with one another, and a ballast member having a central slot extending downwardly from its upper free end forming spaced finger portions at either side thereof detachably positioned at opposite sides of and above said vertical slot with said finger portions extending upwardly therefrom through said aligned opening to tightly engage each side of said body member both below and above said wing member.

3. A duck decoy comprising a body member having a head member secured at one end thereof, said body member being provided with a longitudinal slot extending from its front edge rearwardly therefrom and being further provided with a slot along its bottom edge thereof, a one-piece wing member having a longitudinal slot extending from its rearmost point forwardly therefrom and having an opening positioned therein in alignment with the longitudinal axis thereof, said wing member and said body member being interfitted with one another in transverse relationship by means of their respective slots, said opening and said bottom slot of said wing and said body members respectively being in vertical alignment with one another, and a ballast member having a central slot extending downwardly from its upper free end forming spaced finger portions at either side thereof, a portion of the ballast member being detachably positioned in said bottom slot with said finger portions extending upwardly therefrom through said aligned opening to tightly engage each side of said body member both below and above said wing member.

References Cited in the file of this patent

UNITED STATES PATENTS

| | | |
|---|---|---|
| 282,851 | Danz | Aug. 7, 1883 |
| 1,473,612 | Dewey | Nov. 13, 1923 |
| 2,043,827 | Breuer | June 9, 1936 |
| 2,546,812 | Anderson | Mar. 27, 1951 |
| 2,639,534 | Stossel | May 26, 1953 |

FOREIGN PATENTS

| | | |
|---|---|---|
| 2,806 | Great Britain | 1884 |